United States Patent [19]

Yogo et al.

[11] Patent Number: 4,736,814
[45] Date of Patent: Apr. 12, 1988

[54] SLIPPING PREVENTION CONTROL FOR VEHICLE

[75] Inventors: Kazutoshi Yogo; Hideo Wakata, both of Nagoya, Japan

[73] Assignee: Nippondenso Co., Ltd., Kariya, Japan

[21] Appl. No.: 826,015

[22] Filed: Feb. 4, 1986

[30] Foreign Application Priority Data

Feb. 6, 1985 [JP] Japan .................................. 60-21559

[51] Int. Cl.$^4$ ........................ B60K 28/16; F02D 29/00
[52] U.S. Cl. ............................. 180/197; 123/198 DB; 123/352; 123/361; 361/238; 364/426
[58] Field of Search ................... 180/197; 203/106, 96, 203/97; 364/426, 431.07; 123/198 DB, 350, 351, 352, 353, 361; 361/238

[56] References Cited

U.S. PATENT DOCUMENTS

| | | | |
|---|---|---|---|
| 4,328,776 | 5/1982 | Kuno et al. | 364/431.07 X |
| 4,545,455 | 10/1985 | Kanemura et al. | 180/197 |
| 4,554,634 | 11/1985 | Shinoda | 364/431.07 X |
| 4,554,990 | 11/1985 | Kamiya et al. | 180/197 |
| 4,569,027 | 2/1986 | Nakano et al. | 364/426 X |

FOREIGN PATENT DOCUMENTS

| | | | |
|---|---|---|---|
| 2714113 | 10/1978 | Fed. Rep. of Germany | 180/197 |
| 3206694 | 9/1983 | Fed. Rep. of Germany | 180/197 |
| 3337155 | 4/1984 | Fed. Rep. of Germany | 180/197 |
| 59-68538 | 4/1984 | Japan . | |

Primary Examiner—John J. Love
Assistant Examiner—Mitchell J. Hill
Attorney, Agent, or Firm—Cushman, Darby & Cushman

[57] ABSTRACT

In a wheel slip prevention control system for preventing the slippage of the driven wheel occuring when a vehicle is accelerated, a reference speed is derived from the non-driven wheel speed and the driven wheel speed is corrected by a correction value obtained as a function of a driven wheel acceleration value and a non-driven wheel acceleration value. The throttle valve is controlled with speed corresponding to the slipping condition of the driven wheel, i.e., with a control speed derived as a function of the reference speed and the corrected driven wheel speed, so that the slippage is quickly and effectively prevented.

12 Claims, 4 Drawing Sheets

SLIPPING PREVENTION CONTROL FOR VEHICLE

BACKGROUND OF THE INVENTION

The present invention relates to wheel slip prevention control, and, more particularly, to a system for controlling a vehicle to prevent the slippage of a driven wheel thereof occurring in response to the variations of the vehicle driving condition.

Various types of wheel slip or slipping prevention control systems have been developed with a view to preventing the slippage of driven wheels of a vehicle occurring when starting or accelerating to meet increasing demands for the vehicle's drivability.

One known technique involves controlling the output of the internal combustion engine of a vehicle when the slippage of a driven wheel thereof is detected by deriving the difference between the rotational speeds of the wheel driven by the engine and the non-driven wheel following the driven wheel.

Another approach to resolution of the slipping problem, such as is disclosed in Japanese Patent Provisional Publication No. 59-68538, is that the throttle opening of a carburetor is controlled on the basis of a slip ratio of a the driven wheel derived as a function of driven wheel speed and that of a non-driven wheel speed.

However, such prior art systems are arranged to merely vary the throttle opening of a throttle valve in stages in accordance with the detected slipping condition of a driven wheel, and therefore difficulty would be encountered to effectively and efficiently meet the requirements for eliminating the driven wheel's slippage problem. Thus, a further improvement would be required from the viewpoint of effectively preventing the wheel slippage and increasing the vehicle's drivability.

SUMMARY OF THE INVENTION

It is therefore an object of the present invention to provide a new and improved slipping prevention control system which overcomes the above-described disadvantages inherent in the prior art systems.

With this object and various advantages of the present invention which will be become apparent as the description proceeds, a slipping prevention control system according to the present invention comprises: a first sensor for sensing the speed of rotation of a driven wheel of a vehicle; a sensor sensor for sensing the speed of rotation of a non-driven wheel of the vehicle; and a control unit for deriving a reference speed from the sensed non-driven wheel speed, deriving an acceleration value of the driven wheel from the driven wheel speed sensed by the first sensor, deriving an acceleration value of the non-driven wheel from the non-driven wheel speed sensed by the second sensor, correcting the sensed driven wheel speed by a correction value obtained as a function of the derived driven wheel acceleration value and the derived non-driven wheel acceleration, detecting the slipping condition of the driven wheel, and controlling the opening and closing of a throttle valve of the vehicle with a speed value derived from the derived reference speed and the corrected driven wheel speed in response to the detection of the slippage.

According to a feature of the present invention, the opening and closing control of the throttle valve is effected with a speed value obtained as a function of the reference speed and the corrected driven wheel speed, i.e., with speed proportional to the slipping condition of the driven wheel. This feature offers the advantage of making possible quick and effective prevention of the slippage of the driven wheel occurring in response to the variations of vehicle driving condition.

BRIEF DESCRIPTION OF THE DRAWINGS

The objects and features of the present invention will become more readily apparent from the following detailed description of the preferred embodiments taken in conjunction with the accompanying drawings in which.

DETAILED DESCRIPTION OF THE INVENTION

Figure 1:
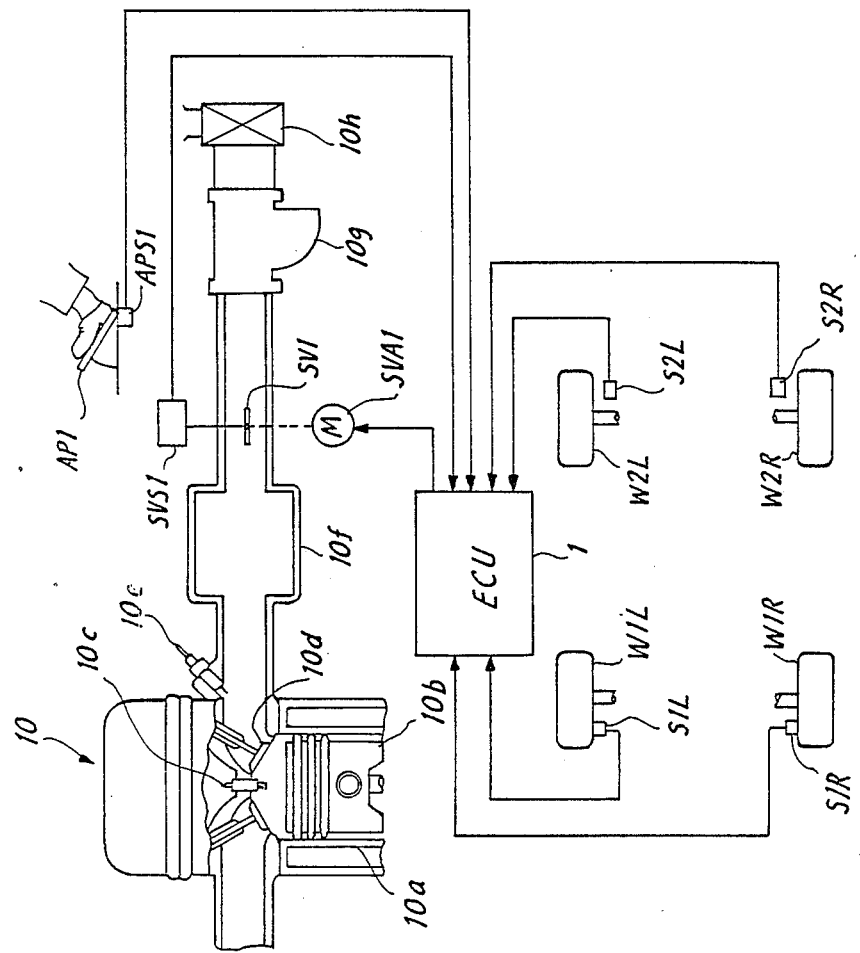
FIG. 1 is a schematic block diagram of a slipping prevention control system according to the present invention incorporated in a vehicle including an internal combustion engine.

As shown in FIG. 1, there is illustrated a wheel slip prevention control system according to an embodiment of the present invention incorporated with a vehicle including an internal combustion engine 10, front wheels W1L and W1R functioning as driven wheels, and rear wheels W2L and W2R functioning as non-driven wheels. The engine 10 is of a well known type comprising a cylinder 10$a$, a piston 10$b$, an ignition plug 10$c$, an intake valve 10$d$, a fuel injection valve 10$e$, a surge tank 10$f$, a airflow meter 10$g$, and an air cleaner 10$h$. An electrically operated throttle valve SV1 is coupled to an accelerator pedal AP1 for regulating the amount of intake air and is disposed in an intake air passage provided between the airflow meter 10$g$ and the surge tank 10$f$. The accelerator pedal AP1 is coupled to a sensor APS1 for detecting the operating amount thereof and the throttle valve SV1 is associated with a sensor SVS1 for detecting the opening degree thereof. Also provided is a throttle valve actuator SVA1 for actuating the throttle valve SV1 in accordance with instructions from an electronic control unit (which will be hereinafter referred to as ECU) 1.

On the other hand, wheel speed sensors S1L, S1R, S2L, and S2R are respectively associated with the front-left wheel W1L, front-right wheel W1R, rear-left wheel W2L, and rear-right wheel W2R for detecting the rotational speed of each sensor wheel, each supplying a signal indicative of the rotational speed of the corresponding wheel to the ECU 1.

Figure 2:
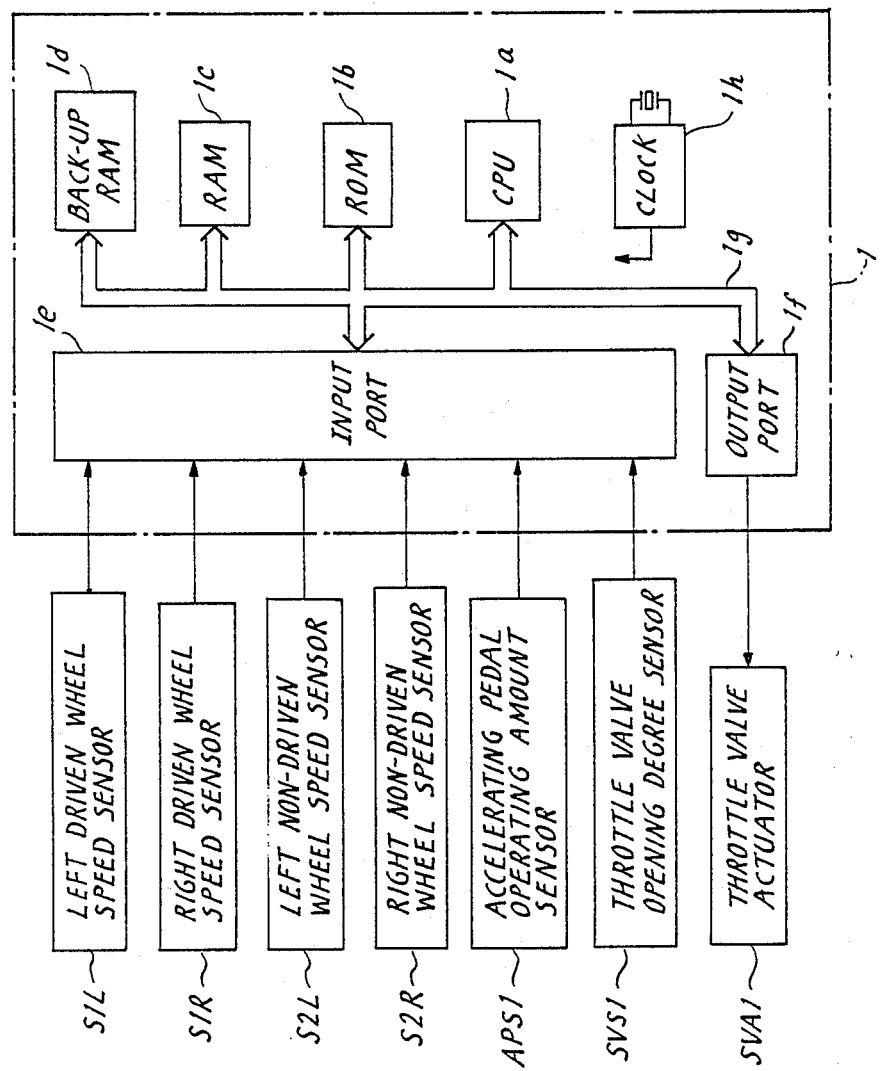
FIG. 2 is an illustration of the detail of the electronic control unit of FIG. 1.

The ECU 1 is arranged as illustrated in FIG. 2, where a central processing unit (CPU) 1$a$ is provided which processes data from each sensor in accordance with a control program and controls the throttle valve actuator SVA1 on the basis of the processed data. Signals to and from the CPU 1$a$ are carried along a common bus 1$g$ to which are coupled the associated units including a read-only memory (ROM) 1$b$ for storing a control program, map data, and so on; a random access memory (RAM) 1$c$ for temporarily storing data from the sensors and various data necessary for the slipping prevention control; a back-up random access memory 1$d$ (back-up RAM) for maintaining data necessary for the following control irrespective of the turning-off of an ignition key switch of the vehicle. Also included is an input port 1e which is coupled to the wheel speed sensors S1L, S1R, S2L, S2R; the accelerating pedal operating amount sensor APS1; and the throttle valve opening degree sensor SVS1 and which has a multiplexer not shown for selectively outputting the output signals of the sensors to the CPU 1a and an analog-to-digital converter (A/D converter) for converting an analog signal to a digital signal. The ECU 1 further includes an output port 1f and a clock signal generator 1h, the output port 1f outputting a control signal to the throttle valve actuator SVA1 and having a drive circuit for supplying a drive current, and the clock signal generator 1h supplying a clock signal at a predetermined interval to the CPU 1a, ROM 1b, RAM 1c and so on to provide a control timing cycle.

Figure 3:
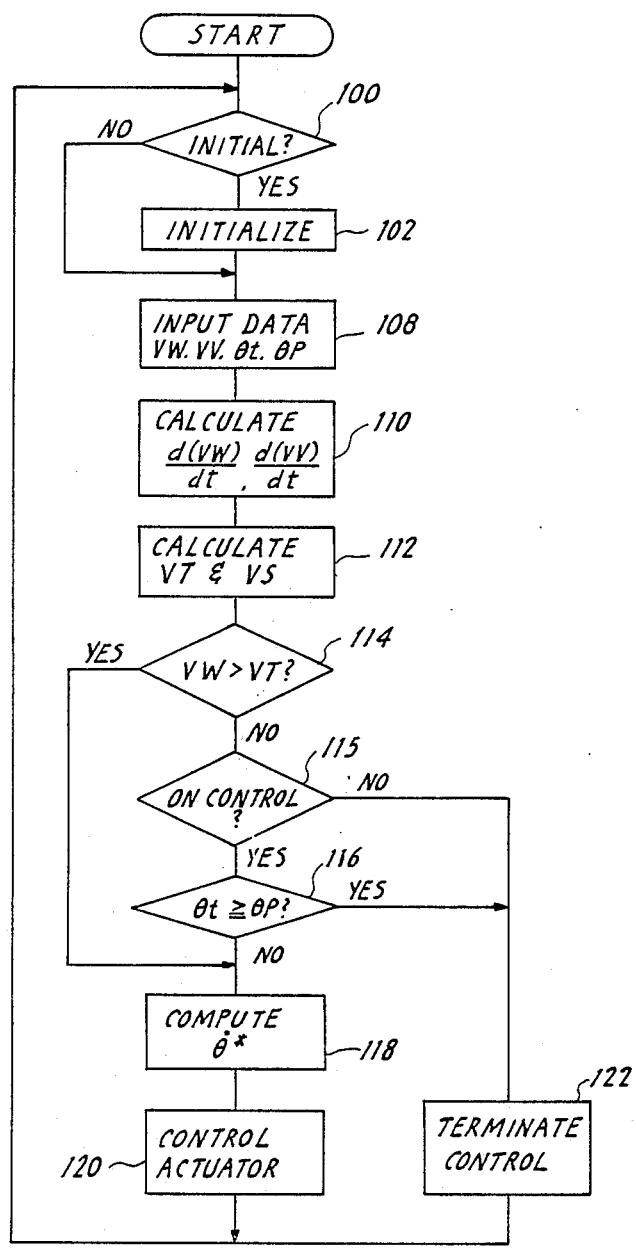
FIG. 3 is a flow chart illustrating the operation performed by the electronic control unit of FIG. 2.

FIG. 3 is a flow chart useful for describing the operation performed for wheel slip prevention control according to the present invention. This operation is repeatedly executed at a predetermined interval.

In a step 100, the CPU 1a checks whether this operation is an initial operation after energization of the ECU 1. If so, control proceeds to a step 108 through an initialization step 102 in which the memory is cleared, a flag is reset, and a timer is reset. Otherwise, control jumps to the step 108 so as not to execute the initialization step 102.

The step 108 is provided for obtaining various data from the sensors. That is, a driven wheel speed VW is derived on the basis of the output signals of the wheel speed sensors S1L and S1R and a non-driven wheel speed VV is also derived on the basis of the output signals of the wheel speed sensors S2L and S2R. It is appropriate that the wheel speed value VW or VV is respectively the average value of wheel speed values of a pair of wheels, i.e., front-left wheel and front-right wheel or rear-left wheel and rear-right wheel. It is also appropriate to employ either of the wheel speed values of a pair of wheels for determining the wheel speed. Furthermore, in the step 108, the opening degree $\theta t$ of the throttle valve is detected on the basis of a signal from the throttle valve sensor SVS1 and the operating amount $\theta p$ of the accelerating pedal is detected on the basis of a signal from the accelerating pedal sensor APS1. Thereafter, a step 110 is executed to derive an acceleration value for each of the wheels by differentiating the wheel speed values VW and VV. That is, the driven wheel acceleration value is derived from d(VW)/dt and the non-driven wheel acceleration value is obtained by d(VV)/dt.

The CPU 1a advances to a step 112 to derive a reference speed VT and a corrected driven wheel speed VS from Equations 1 and 3 below.

$$VT = K \leq VV + VO \quad (1)$$

$$VS = VW + A1\{d(VW)/dt - d(VV)/dt\} \quad (2)$$

where:
K = constant
VV = non-driven wheel speed
VO = constant correction term
VW = driven wheel speed
A1 = constant (A1 $\geq$ 0)
d(VW)/dt = driven wheel acceleration
d(VV)/dt = non-driven wheel acceleration A subsequent step 114 follows to check the occurrence of slippage with respect to the driven wheel. The occurrence of slippage is checked by comparing the driven wheel speed VW obtained in the step 108 with the reference speed VT derived in the step 112. If VW > VT, that is, the slippage is detected, control jumps to a step 118. If not, the step 114 is followed by a step 115 in which the CPU 1a checks whether or not the ECU 1 is enabled for slipping prevention control. If not, in step 115, operational flow returns through a step 122 to the step 100. If so, a step 116 follows to compare the throttle valve opening degree $\theta t$ with the accelerating pedal operating amount $\theta p$ in order to check the corresponding relation between them. That is, the step 116 is provided for determining, in accordance with the comparison, whether there is the requirement for slipping prevention control. In the step 116, when $\theta t$ becomes not less than $\theta p$, control goes to the step 122 to terminate the slipping prevention control. Here, in theory, the control should be terminated in the step 122 when $\theta t$ becomes equal to $\theta p$. However, it is seldom during actual running of the vehicle that both becomes equal each other, and therefore, in this embodiment, the program control sequence checks if $\theta t \geq \theta p$. On the other hand, if both are not in corresponding relation to each other, i.e., $\theta t < \theta p$, the step 116 is followed by the step 118 in which an ideal throttle valve driving speed $\dot{\theta}^*$ is given by the following Equation 3.

$$\dot{\theta}^* = A2 \times (VS - VT) \quad (3)$$

where:
A2 = constant (A2 < 0)
VS = corrected driven wheel speed
VT = reference speed That is, the Equation 3 is rewritten in relation to the Equation 2 as follows.

$$\dot{\theta}^* = a(VW - VT) + b\{d(VW)/dt - d(VV)/dt\}$$

where:
a = constant
b = constant

A subsequent step 120 is executed after the calculation of the ideal throttle valve driving speed in the previous step 118. Here, the ECU 1 outputs a control signal so that the opening and closing speed of the throttle valve SV1 approaches the ideal throttle valve driving speed $\dot{\theta}^*$ obtained in the step 118 and a driving current is supplied to the throttle valve actuator SVA1.

The ideal throttle valve driving speed $\dot{\theta}^*$ assumes positive and negative values. When $\dot{\theta}^* \geq 0$, the throttle valve actuator SVA1 drives the throttle valve in the opening direction with a speed of $|\dot{\theta}^*|$. If $\dot{\theta}^* < 0$, the throttle value is driven in the closing direction with a speed of $|\dot{\theta}^*|$.

On the other hand, when the exit from the decision step 116 is to the step 122, the slipping prevention control is terminated, and the ECU 1 controls the throttle valve actuator SVA1 so that the throttle valve opening degree $\theta t$ always corresponds to the accelerating pedal AP1 operating amount $\theta p$.

Figures 4, 5:
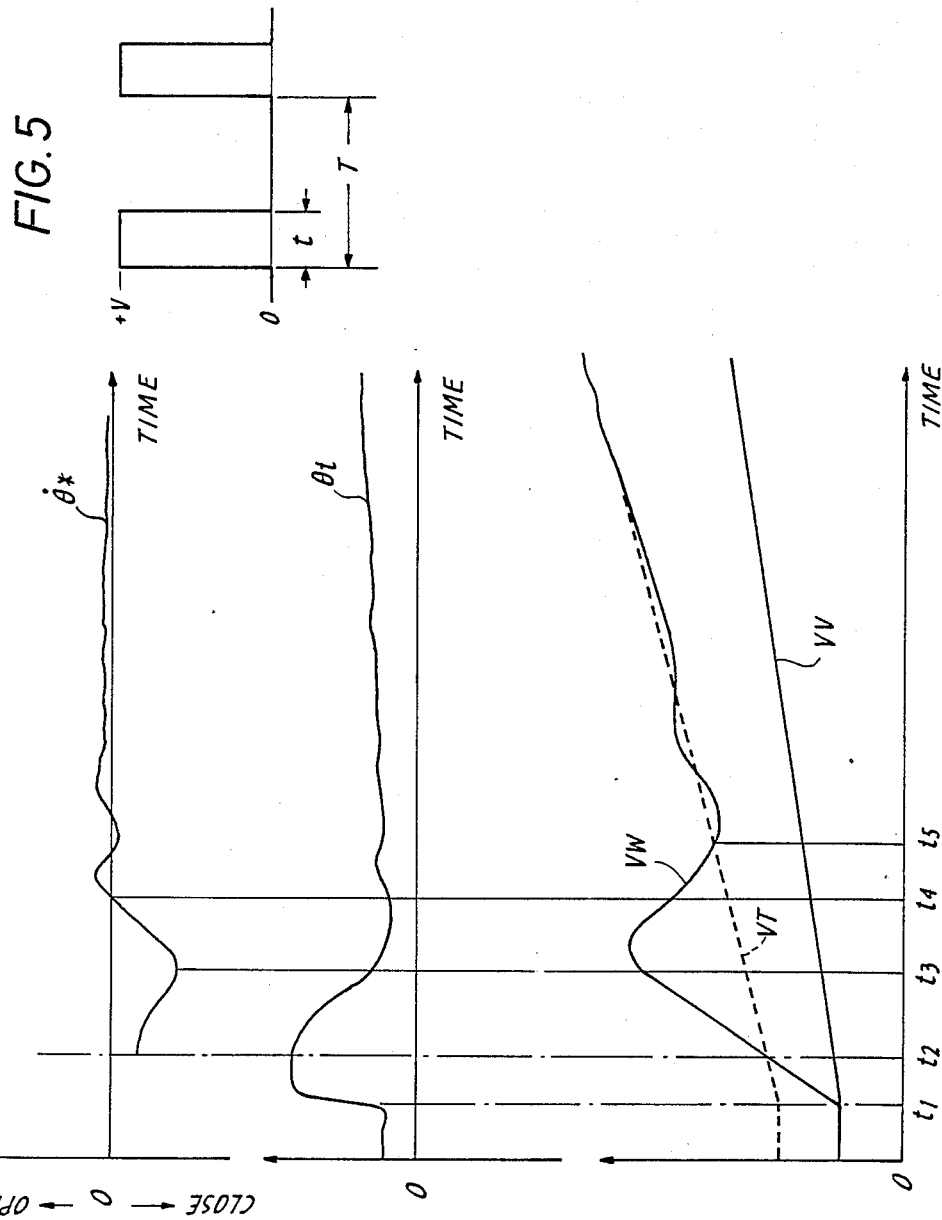
FIG. 4 is a timing chart useful for understanding the operation of the present invention.
FIG. 5 is an illustration of a pulse signal indicative of a duty cycle ratio.

FIG. 4 is a timing chart useful for understanding the operation performed by the ECU1.

Let it be assumed that the accelerating pedal AP1 is operated by a driver at the time t1. With the operation by the driver, the throttle valve opening degree $\theta t$ is rapidly increased as illustrated in the timing chart, and further the driven wheel speed VW is rapidly increased and exceeds the reference speed VT at the time t2. At the time t2, the ECU 1 detects the occurrence of excessive slippage of the driven wheel (the step 114 of FIG. 3) and then starts the slipping prevention control in response to this detection. In the control, the opening and closing of the throttle valve SV1 is performed with the ideal throttle valve driving speed proportional to the difference between the reference speed VT and corrected driven wheel speed VS (the steps 118 and 120).

In the vicinity of the time t2, the opening degree of the throttle valve SV1 is greater and therefore the difference between the driven wheel speed VW and reference speed VT, as indicated by the dotted line, is increased with time. In this case, the ideal throttle valve driving speed $\dot{\theta}^*$ is increased in the direction to rapidly closing the throttle valve SV1 and reaches the maximum value at the time t3, whereby the throttle valve SV1 is quickly closed by the operation of the throttle valve actuator SVA1 which is driven under control of the ECU 1. Therefore, within the time period from the time t2 to the time t4, the throttle valve opening degree $\theta$t is decreased, and the driven wheel speed VW is also decreased to approach the reference speed VT. Although the driven wheel speed VW becomes equal to the reference speed VT at the time t5, the slipping prevention control is continuously performed after the time t5 to prevent the occurrence of the greater difference between the speeds VW and VT. Therefore, although the slippage has not occurred, the ECU 1 checks the execution of the slipping prevention control in the step 115. Thereafter, the ideal throttle valve driving speed $\dot{\theta}^*$ assumes a value close to zero and the throttle valve opening degree $\theta$t approximately assumes a constant value. The slipping prevention control for the driven wheel is performed until the throttle valve opening degree $\theta$t stably becomes equal to the accelerating pedal operating amount $\theta$p and is terminated in response to the equality (the steps 116 and 122).

It will be understood from the above-description that the prevention of slippage can be quickly accurately achieved because the throttle valve is driven with a speed proportional to the slipping condition.

Although in the foregoing description the accelerating pedal is electrically coupled to the throttle valve, the present invention can also be adapted for the arrangement in which the accelerating pedal is mechanically coupled to the throttle valve.

In the above-described embodiment of the present invention, as indicated by Equation 2, the driven wheel speed VW is corrected by a value proportional to the difference between the driven wheel acceleration d(VW)/dt and the non-driven wheel acceleration d(VV)/dt. However, it is appropriate that the correction is made by the following equation.

$$VS = VW + A I \{ d(VW)/dt - K \times d(VV)/dt \}$$

where K is constant.

Furthermore, in the case that a direct current motor is employed as a drive source of the throttle valve actuator, the ideal throttle valve driving speed can be obtained in accordance with the duty cycle control. That is, a duty ratio D corresponding to an ideal throttle valve driving speed $\dot{\theta}^*$ is predetermined and a pulse signal indicative of the duty ratio corresponding to the obtained driving speed $\dot{\theta}^*$ is supplied to the actuator. FIG. 5 is an illustration of the pulse signal. In FIG. 5, the reference character t represents a pulse duration and the character T designates a pulse interval. The duty cycle ratio D is given by t/T.

In the above-noted embodiment of the present invention, control is performed such that the slipping prevention control is terminated when the throttle valve opening degree $\theta$t becomes equal to the accelerating pedal operating amount $\theta$p. Of course, it is also possible to use a switch to detect whether or not the throttle valve opening degree and the movement distance of the accelerating pedal are in a corresponding relation to each other and terminate the slipping prevention control in response to the output signal of the switch. For example, if both are in a corresponding relation to each other, the switch is closed to generate a signal indicative of the correspondance. If not, it is opened to stop the generation of the signal.

According to the embodiment of the present invention, the values $\theta$t and $\theta$p are not directly used for the slipping prevention control because the speed for the opening and closing of the throttle valve, not the opening degree thereof, is controlled. Therefore, the throttle valve opening sensor and accelerating pedal operating amount sensor are not necessarily required when the switch is employed.

It is to be understood that the invention is not limited in its application to the details of construction and arrangement of parts illustrated in the accompanying drawings, since the invention is capable of other embodiments and of being practice or carried out in various ways. Also it is to be understood that the phraselogy or terminology employed herein is for the purpose of discription and not of limitation.

What is claimed is:

1. A system for preventing the slippage of a vehicle, comprising:
    first sensor means for sensing the speed of rotation of a driven wheel of said vehicle;
    second sensor means for sensing the speed of rotation of a non-driven wheel of said vehicle;
    means for deriving a slippage reference speed from the sensed non-driven wheel speed;
    means for deriving an acceleration value of said driven wheel from the driven wheel speed sensed by said first sensor means;
    means for deriving an acceleration value of said non-driven wheel from the non-driven wheel speed sensed by said second sensor means;
    means for correcting the sensed driven wheel speed by a correction value obtained as a function of the derived driven wheel acceleration value and the derived non-driven wheel acceleration value;
    slippage detecting means for detecting the occurrence of slipping of said driven wheel;
    opening and closing speed calculating means for calculating an opening and closing speed of a throttle valve of said vehicle as a function of the difference between the derived slippage referenced speed and the corrected driven wheel speed in response to the detection of the slippage; and
    throttle valve driving means for controlling the opening and closing of said throttle at the speed calculated in said opening and closing calculating means.

2. A system as claimed in claim 1, wherein said slippage detecting means determines the occurrence of the slippage by comparing the driven wheel speed sensed by said first sensor means with the slippage reference speed derived from the sensed non-driven wheel speed.

3. A system as claimed in claim 1, wherein said driven wheel speed correction means corrects the sensed driven wheel speed by a correction value proportional to the difference between the derived driven wheel acceleration value and the derived non-driven wheel acceleration.

4. A system as claimed in claim 1, wherein
said opening and closing speed calculating means determines the opening and closing speed of said throttle valve to be proportional to the difference between the slippage reference speed derived from the sensed non-driven wheel speed and the corrected driven wheel speed.

5. A system as claimed in claim 1, further including third sensor means for sensing the opening degree of said throttle valve and fourth sensor means for sensing the operating amount of an accelerating pedal of said vehicle, wherein said throttle valve control means terminates the throttle valve control when the sensed opening degree and the sensed operating amount are continuously in corresponding relation to each other.

6. A system for preventing the slippage of a vehicle, comprising:
first sensor means for sensing the speed of rotation of the driven wheel of said vehicle;
second sensor means for sensing the speed of rotation of a non-driven wheel of said vehicle;
means for deriving a slippage reference speed from the sensed non-driven wheel speed;
means for deriving an acceleration value of said driven wheel from the driven wheel speed sensed by said first sensor means;
means for deriving an acceleration value of said non-driven wheel from the non-driven wheel speed sensed by said second sensor means;
slippage detecting means for detecting the occurrence of slippage;
opening and closing speed calculating means for calculating an opening and closing speed of a throttle valve of said vehicle on the basis of the difference between the sensed driven wheel speed and the derived slippage reference speed, the derived driven wheel acceleration value, and the derived non-driven wheel acceleration value in response to the detection of the slippage; and
throttle valve control means for controlling said throttle valve at the speed calculated in said opening and closing speed calculating means.

7. A system as claimed in claim 6, wherein the opening and closing speed $\theta^*$ of said throttle valve is calculated in accordance with the following equation:

$$\dot{\theta}^* = a(VW - VT) + b\{d(VW)/dt - d(VV/dt)\}$$

wherein
VW = driven wheel speed
VT = slippage reference speed
d(VW)/dt = driven wheel acceleration value
d(VV)/dt = non-driven wheel acceleration value
a,b = constants.

8. A method for preventing the slippage of a vehicle, comprising the steps of:
(a) sensing the speed of rotation of a driven wheel speed of said vehicle;
(b) sensing the speed of rotation of a non-driven wheel of said vehicle;
(c) deriving a slippage reference speed from the sensed non-driven wheel speed;
(d) deriving an acceleration value of said driven wheel from the sensed driven wheel speed;
(e) deriving an acceleration value of said non-driven wheel from the sensed non-driven wheel speed;
(f) correcting the sensed driven wheel speed by a correction value obtained as a function of the derived driven wheel acceleration value and the derived non-driven wheel acceleration value;
(g) detecting the occurrence of slippage of said driven wheel;
(h) calculating an opening and closing speed of a throttle valve of said vehicle as a function of the difference between the derived slippage reference speed and the corrected driven wheel speed in response to the detection of the slippage; and
(i) controlling the opening and closing of said throttle at the speed calculated in the opening and closing calculating step (h).

9. A method as claimed in claim 8, wherein the step (g) comprising:
comparing the driven wheel speed sensed in the step (a) with the reference speed derived in the step (c); and
determining the occurrence of slippage of said driven wheel in accordance with the results of the comparison.

10. A method as claimed in claim 8, wherein said correction value is a value proportional to the difference between the derived driven wheel acceleration value and the derived non-driven wheel acceleration value.

11. A method as claimed in claim 8, wherein said throttle valve control speed is proportional to the difference between the derived reference speed and the corrected driven wheel speed.

12. A method as claimed in claim 8, further comprising the steps of:
sensing the opening degree of said throttle valve;
sensing the operating amount of an accelerating pedal of said vehicle; and
terminating the throttle valve control when the sensed opening degree and the sensed operating amount are continuously in corresponding relation to each other.

* * * * *

UNITED STATES PATENT AND TRADEMARK OFFICE
CERTIFICATE OF CORRECTION

PATENT NO. : 4,736,814
DATED : April 12, 1988
INVENTOR(S) : Yogo et al.

It is certified that error appears in the above-identified patent and that said Letters Patent is hereby corrected as shown below:

Column 3, line 57. Delete "$VT = K \leq VV + VO$" and substitute -- $VT = K \times VV + VO$ -- therefor.

Signed and Sealed this

Sixth Day of December, 1988

*Attest:*

DONALD J. QUIGG

*Attesting Officer*      *Commissioner of Patents and Trademarks*